United States Patent [19]

Hunsbedt et al.

[11] Patent Number: 4,959,193

[45] Date of Patent: Sep. 25, 1990

[54] INDIRECT PASSIVE COOLING SYSTEM FOR LIQUID METAL COOLED NUCLEAR REACTORS

[75] Inventors: Anstein Hunsbedt, Los Gatos; Charles E. Boardman, Saratoga, both of Calif.

[73] Assignee: General Electric Company, San Jose, Calif.

[21] Appl. No.: 350,187

[22] Filed: May 11, 1989

[51] Int. Cl.$^5$ .............................................. G21C 15/18
[52] U.S. Cl. ..................................... 376/299; 376/273; 376/293
[58] Field of Search ............... 376/299, 298, 293, 294, 376/295, 283, 273, 274

[56] References Cited

U.S. PATENT DOCUMENTS

| | | | |
|---|---|---|---|
| 4,508,677 | 8/1985 | Craig et al. | 376/299 |
| 4,678,626 | 7/1987 | Germer | 376/299 |

FOREIGN PATENT DOCUMENTS 2506063  5/1981  France ................ 376/299

*Primary Examiner*—Daniel D. Wasil
*Attorney, Agent, or Firm*—Robert R. Schroeder

[57] ABSTRACT

A liquid metal cooled nuclear reactor having a passive cooling system for removing residual heat resulting from fuel decay during reactor shutdown. The passive cooling system comprises a plurality of partitions surrounding the reactor vessel in spaced apart relation forming intermediate areas for circulating heat transferring fluid which remove and carry away heat from the reactor vessel. The passive cooling system includes a closed primary fluid circuit through the partitions surrounding the reactor vessel and a partially adjoining secondary open fluid circuit for carrying transferred heat out into the atmosphere.

15 Claims, 2 Drawing Sheets

INDIRECT PASSIVE COOLING SYSTEM FOR LIQUID METAL COOLED NUCLEAR REACTORS

The Government of the United States has rights in this invention under Contract No. DE-AC03-85NE.

FIELD OF THE INVENTION

This invention relates to an improvement in a passive cooling system for liquid metal cooled nuclear reactors having a pool of liquid metal coolant with the heat generating fissionable fuel core substantially immersed in the liquid metal pool, such as the type disclosed in U.S. Pat. No. 4,508,677, issued Apr. 2, 1985.

BACKGROUND OF THE INVENTION

In the operation of liquid sodium or sodium-potassium metal cooled nuclear reactors for power generation, it may be necessary to shut down the fission reaction of the fuel to deal with emergencies or carry out maintenance services. Reactor shut down is attained by inserting neutron absorbing control rods into the core of fissionable fuel to deprive the fuel of the needed fission producing neutrons. However decay of the fuel in the shut down reactor continues to produce heat in significant amounts which must be dissipated from the reactor unit.

The heat capacity of the liquid metal coolant and adjacent structure aid in dissipating the residual heat. However, the structural materials of the nuclear reactor may not be capable of safely withstanding prolonged high temperatures. For example the concrete of the walls of the typical housing silo may splay and crack when subjected to high temperatures. Accordingly, auxiliary cooling systems are commonly utilized to safely remove heat from the nuclear reactor structure during shut down.

Conventional nuclear reactors have utilized a variety of elaborate energy driven cooling systems to dissipate heat from the reactor. In many of the situations warranting a shutdown, the energy supply to the cooling systems make the cooling systems themselves subject to failure. For example, pumps and ventilation systems to cool the core may fail. Furthermore, if operator intervention is necessary, there are foreseeable scenarios in which the operator would be unable to provide the appropriate action. The most reliable and desirable cooling system would be a completely passive system which could continuously remove the residual heat generated after shutdown.

Liquid metal cooled reactors such as the modular type disclosed in U.S. Pat. No. 4,508,677, utilizing sodium or sodium-potassium as the coolant provides numerous advantages. Water cooled reactors operate at or near the boiling point of water. Any significant rise in temperature results in the generation of steam and increased pressure. By contrast, sodium or sodium-potassium has an extremely high boiling point, in the range of 1800 degrees Fahrenheit at one atmosphere pressure. The normal operating temperature of the reactor is in the range of about 900 degrees Fahrenheit. Because of the high boiling point of the liquid metal, the pressure problems associated with water cooled reactors and the steam generated thereby are eliminated. The heat capacity of the liquid metal permits the sodium or sodium-potassium to be heated several hundred degrees Fahrenheit without danger of materials failure in the reactor.

The reactor vessels for pool-type liquid-metal cooled reactors are essentially open top cylindrical tanks without any perforations to interrupt the integrity of the vessel walls. Sealing of side and bottom walls is essential to prevent the leakage of liquid metal from the primary vessel. The vessel surfaces must also be accessible for the rigorous inspections required by safety considerations.

In the typical sodium cooled reactor, two levels of sodium loops are used. Usually, a single primary loop and two or more secondary loops are used. The primary loop contains very radioactive sodium which is heated by the fuel rods. The primary loop passes through heat exchangers to exchange the heat with one of the nonradioactive secondary sodium loops.

Upon shutdown of the reactor by fully inserting the control rods, residual heat continues to be produced and dissipated according to the heat capacity of the plant. Assuming that the reactor has been at full power for a long period of time, during the first hour following shutdown, an average of about 2% of full power continues to be generated. The residual heat produced continues to decay with time.

This invention comprises an improvement upon the passive cooling system for removing shutdown decay heat from a liquid metal cooled nuclear reactor disclosed and claimed in U.S. Pat. No. 4,678,626, issued Dec. 2, 1985.

The disclosed contents of the above noted U.S. Pat. Nos. 4,508,677 and 4,678,626, comprising related background art, are incorporated herein by reference.

SUMMARY OF THE INVENTION

This invention comprises an improved shut down, passive heat removal system for liquid metal cooled nuclear reactors which transfers reactor decay and sensible heat from the fuel core and liquid metal coolant by means of the inherent thermal energy transfer mechanisms of conduction, radiation, convection and natural convection of fluids out to the ambient atmosphere. The improved system of the invention is entirely passive and operates continuously through the inherent phenomenon of natural convection in fluids, conduction, convection, and thermal radiation.

The invention particularly includes a closed primary circuit containing an inert fluid such as nitrogen gas located adjacent to or within the conventional reactor structure for the indirect transfer of thermal energy absorbed from the reactor fuel core and liquid metal coolant to a secondary open fluid circuit which in turn safely exhausts the transferred heat out into the surrounding atmosphere.

In the event of a reactor shutdown, after the control rods are fully inserted into the fuel core, the heat generated by the fuel rods is transferred through the reactor vessel across an inert gas gap to the surrounding containment vessel primarily by the thermal radiation, with a small fraction of the heat transferred by conduction and convection in the contained inert gas. Surfaces of high thermal emissivity provided on the outside of the reactor vessel and the interior of the containment vessel increase the efficiency of the heat transfer.

Heat is then removed from the outside surface of the containment vessel partly by thermal radiation and partly by direct convection to the circulating inert gas in the primary closed circuit in the passage between the containment vessel and the shield. The energy is then transported to the atmosphere by naturally circulating air in the secondary open circuit. Modular reactor vessels have approximately one third the diameter and are about the same height as conventional nuclear reactor vessels. In modular reactors, the ratio of the surface area to the power generated is approximately three times greater than the surface area to power ratio in a conventional and large reactor. This provides sufficient surface area over which the residual heat may be passively dissipated. The highly emissive exterior surfaces of the containment vessel also enhance the heat transfer.

OBJECTS OF THE INVENTION

It is a primary object of this invention to provide an improved passive cooling system for liquid metal cooled nuclear reactors for the removal of decay and sensible heat.

It is also an object of this invention to provide an indirect cooling system for the passive cooling of liquid metal cooled nuclear reactors comprising a core of fissionable fuel substantially immersed within a pool of liquid metal coolant.

It is another object of this invention to provide an improved passive cooling system for liquid metal cooled nuclear reactors comprising an intermediate closed cooling circuit containing an inert fluid heat transferring medium, which obstructs a release of liquid sodium coolant escaping from the reactor vessel and deleterious contact of the sodium with the cooling medium vented out into the atmosphere for heat dissipation.

It is a further object of this invention to provide a heat removing system for liquid metal cooled nuclear reactors which is entirely passive and operates continuously by the inherent phenomenon of natural convection in fluids, conduction, convection, and thermal radiation.

It is a still further object of this invention to provide an improved passive system for removing decay and sensible heat produced during shut down in a liquid metal cooled nuclear reactor utilizing a combination of sequential fluid circuits including a closed circulating flow course containing an inert fluid medium and an open circulating flow course utilizing ambient air which safely expels the removed heat out into the atmosphere.

DETAIL DESCRIPTION OF THE INVENTION

Pool-type liquid-metal cooled reactors have sufficient surface area to accommodate dissipation of residual heat during reactor shutdown events. Overall, the reactor system has a relatively small heat capacity. The problem remaining is to dissipate the residual heat without significantly damaging the containment structures. A completely passive cooling system eliminates reliance on energy driven pumps and fans and the need for operator intervention. At the same time, the containment vessel itself must not be structurally modified due to the size constraints on modular reactors, and the necessity of a smooth, unperforated tank structure to prevent any areas where stresses might accumulate. Strict inspection requirements also require that the containment vessel be simple to inspect both during manufacture and erection of the structure.

Figure 1:
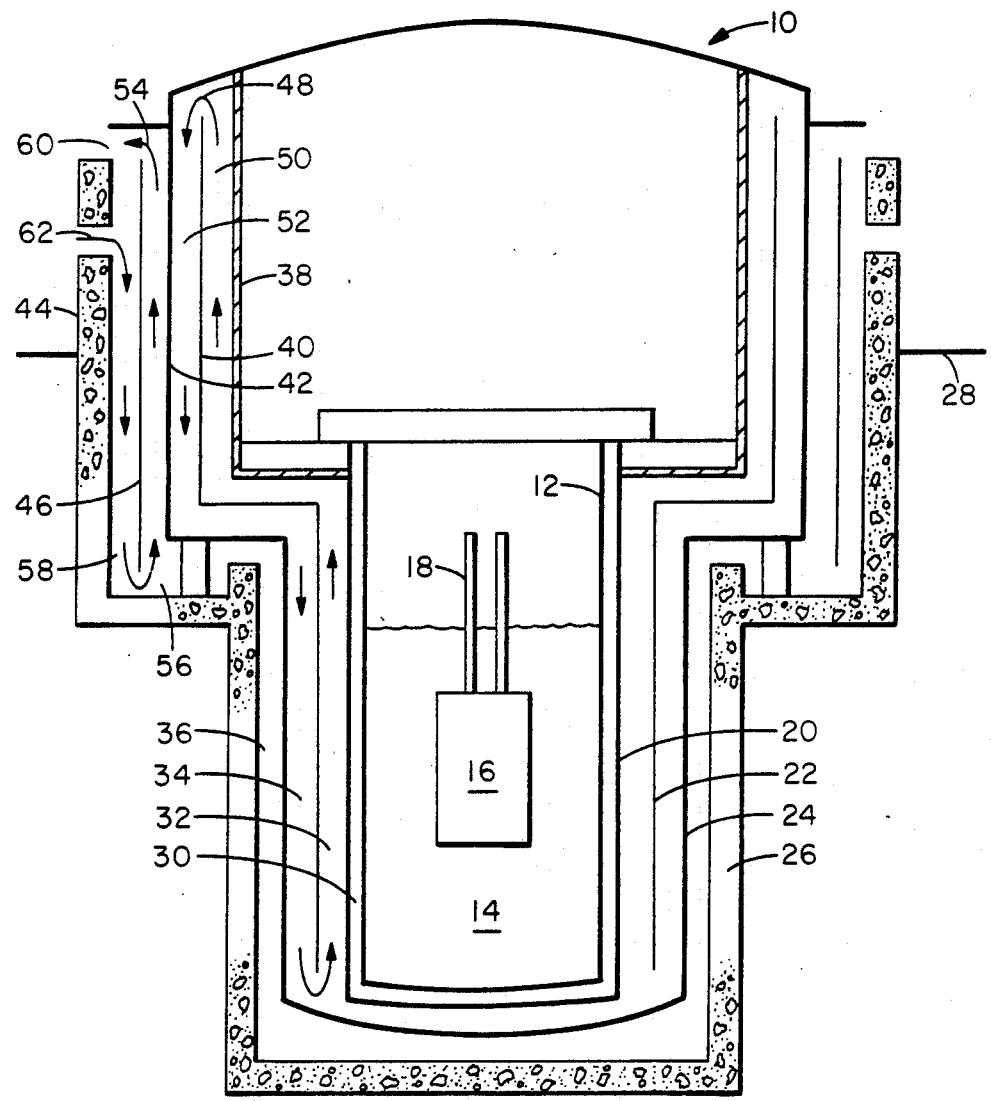
FIG. 1 is a schematic illustration of a liquid metal cooled nuclear reactor plant in cross-section.

Referring to FIG. 1 of the drawings, an embodiment of a pool-type, liquid metal cooled nuclear reactor plant 10, comprises a reactor vessel 12, typically consisting of an cylindrical tank positioned with its longitudinal axis extending vertically upright, and having an open upper end provided with a removable cover. Reactor vessel 12 contains a pool of liquid metal coolant 14, such as sodium metal, with a heat producing core of fissionable fuel 16 substantially immersed within the liquid metal coolant pool 14 for heat transfer. Fission action of the fuel and the rate thereof is governed by neutron absorbing control rods 18 moving out from or into the fuel core 16.

The reactor vessel 12 is enclosed within a concentrically surrounding guard vessel 20 in spaced apart relation. A preferred embodiment includes a collector cylinder 22 encircling substantially the length of the guard vessel 20 in spaced apart relation. A containment vessel 24 concentrically surrounds the collector cylinder 22 with the guard vessel 20 and reactor vessel 12, in spaced apart relation. A concrete silo 26 houses the concentrically combined and spaced apart arrangement of containment vessel 24, collector cylinder 22, guard vessel 20 and reactor vessel 12.

Preferably the concrete silo 26 is substantially buried into the ground to the extent that its contained reactor vessel 12 and adjoining vessels and cylinder are located at least below the ground surface, shown in the drawings as 28. Locating the liquid metal containing reactor vessel below ground surface precludes the escape of any liquid metal regardless of any loss of integrity of the plant.

This arrangement of these combined components in surrounding or encircling and spaced apart positions, provides for their respective cylindrical side walls forming a series of partitions with intermediate spaces. Specifically, a space 30 between the partitions comprising the side walls of reactor vessel 12 and guard vessel 20; a space 32 between the partitions comprising the side walls of the guard vessel 20 and collector cylinder 22; a space 34 between the partitions comprising the side walls of the collector cylinder 22 and containment vessel 24; and a space 36 between the partitions comprising the side walls of the containment vessel 24 and the concrete silo 26.

In a preferred embodiment of the invention wherein the above combined components are circular in cross-section and concentrically surround or encircle one another, the intermediate spaces 30, 32, 34 and 36 are each substantially annular in cross-section.

The guard vessel 20, the collector cylinder 22, containment vessel 24 and concrete silo 26 are each provided with upward projecting continuations or walls extending above the uppermost portion of the reactor vessel 12, and up beyond the ground level 28. Thus the annular spaces 32, 34 and 36 formed intermediate the continued partitions formed by the extended side walls of the combined components extend above the heat producing reactor and its enclosing vessel 12, namely a wall 38 continuing from the guard vessel 20, the wall 40 continuing from the collector cylinder 22, the wall 42 continuing from the containment vessel 24 and the upper portion of the wall 44 of the concrete silo 26.

These extensions from the vessel side walls continue or otherwise provide the partitions which define the intermediate spaces 32, 34 and 36. The space 36 intermediate the extended wall of the containment vessel 24 adjacent to the upper portion of the reactor vessel 12 and extending upward therefrom, and the upper wall 44 portion of the concrete silo 26 is divided by partition 46 extending substantially the height of the silo upper wall 44. Partition 46 provides for fluid communication at its lower end between the divided portions of intermediate space 36.

In the embodiment shown in FIG. 1 the space 30 intermediate the reactor vessel 12 and guard vessel 20 is filled with an inert gas, such as argon, and sealed. The guard vessel 20 and intermediate inert gas serves as a protective measure against the occurrence of a break of the reactor vessel 12 and in turn leaking of liquid metal coolant such as sodium.

The space 32 intermediate the guard vessel 20 and the collector cylinder 22 is in fluid communication with the space 34 intermediate the collector cylinder 22 and the containment vessel 24 at both their lower and upper extremities. This arrangement of connecting intermediate spaces 32 and 34, forms a closed circulating fluid flow course 48 for recirculating a heat transporting fluid coolant in a recycling path, including a riser duct 50 having a portion in contact with a substantial surface area of the guard vessel 20 side wall, and a flow return downcomer duct 52. The heat transporting fluid coolant is preferably an inert gas such as nitrogen.

The space 36 intermediate the containment vessel extended wall 42 and concrete silo upper wall portion 44 which is divided by partition 46, forms a second circulating fluid flow course 54 which is open to the ambient atmosphere. Circulating fluid flow course 54 comprises a riser duct 56 which adjoins a portion of the closed circulating fluid flow course 48, such as the upper portion of downcomer duct 52 for heat transfer, and a downcomer duct 58. The downcomer duct 58 is provided with an opening 62 to the surrounding atmosphere and riser duct with opening 60 to the surrounding atmosphere whereby ambient air can be drawn in through opening 62, pass down through duct 58, then back up through duct 56, adjoining an upper portion of the closed fluid flow course 48, and out though opening 60.

In operation, heat produced by the fuel is conveyed to the reactor vessel 12 by the natural convection of the liquid metal coolant, then transferred mainly by thermal radiation across the argon gas containing space 30 to the guard vessel 20. The heat is absorbed by the inert gas contained in the riser duct 50 which is in contact with the outer surface of a portion of the guard vessel 20, and is carried along in the closed circulating fluid course 48 due to the added heat inducing a natural draft within the riser duct 50. The circulating fluid with the added heat continues around through the downcomer duct 50 adjoining the open circulating fluid course 54 and gives up the heat to the cooler air within riser duct 56. Thus the increased heat induces a natural draft within the riser duct 56 of the open circulating fluid course 56 whereby the heat augmented air is vented into the atmosphere through opening(s) 60, expelling the heat, while drawing cool replacement air in through opening 62 and down through downcomer duct 58 then up through riser duct 56 to continue the heat evacuation process. At the same time continued emissions of heat from the fuel core and transfer to the inert gas contents of the closed circulating fluid course 48 perpetuates the cycling of the heat carrying fluid through the closed course continuously carrying away the heat and passing it on to the air in the open circulating fluid course 54 for dissipation into the ambient atmosphere.

Thermal performance studies of the system indicate that the maximum average core sodium outlet temperatures for a decay heat removal transient is about 1140 degrees F. which is well below the current ASME service level temperature limit of 1200 degree F. based on nominal calculations.

Figure 2:
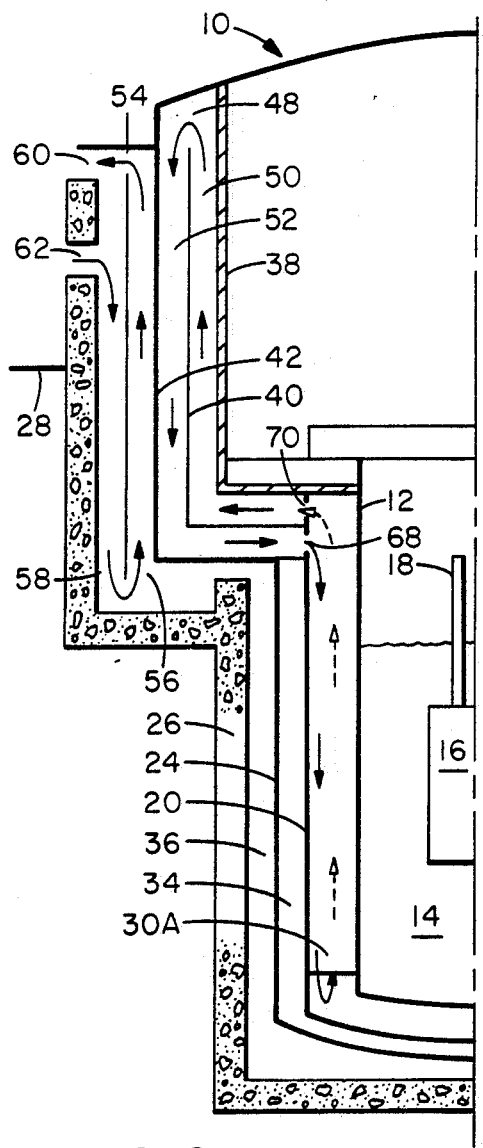
FIG. 2 is a schematic illustration of a liquid metal cooled nuclear reactor plant in cross-section showing a variation of the invention.
Figure 3:
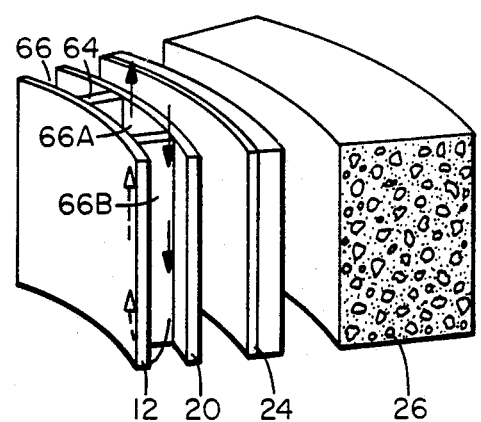
FIG. 3 is an exploded view illustrating in detail a portion of the composite side structure of the variation shown in FIG. 2.

An alternative embodiment of this invention is illustrated in FIGS. 2 and 3 of the drawings. The concentrically arranged, spaced apart combination of components comprise the reactor vessel 12 surrounded by the guard vessel 20 which in turn is surrounded by the containment vessel 24, and all are enclosed within the concrete silo 26.

The space 30A between the reactor vessel 12 and the guard vessel 20 contains a multiplicity of baffles 64 extending between the partition provided by the side wall of the reactor vessel and the partition provided by the side wall of the guard vessel. The baffles 64, which are generally radially aligned or perpendicular to the partitions provided by the vessel walls, divide the intermediate space 30A into a plurality of channels 66 which communicate with each other at their lowermost end.

The closed circulating fluid course 48 of this embodiment includes the channels 66 extending intermediate the partitions formed by the side walls of the reactor vessel 12 and guard vessel 20, and baffles 64. Alternate channels 66A comprise riser ducts 50 and alternate channels 66B comprise downcomer ducts 52 which respectively are in fluid communication with their corresponding segments of the closed circulating fluid course 48 through orifices 68 and 70.

Thus, the inert gas of this embodiment cycles through the closed circulating fluid course 48 traveling down through downcomer 52 through flow openings or orifices 68 into a plurality of the alternating channels 66B and under baffles 64 and up into channels 66A. Heat is absorbed from the reactor vessel wall which induces a natural draft and the fluid flow carries the heat up the alternate channels 66A, through orifices 70 and continuing up riser duct 50, where the carried heat is given up to the adjoining open circulating fluid course 54, then around through downcomer 52. The adjoining open circulating fluid course 54 then expels the transported heat out into the atmosphere.

This embodiment provides for more efficient heat transfer from the reactor vessel 12 to the closed circulating fluid course 48 through the elimination of the relatively high thermal resistance attributable to the argon gas body whereby the primary mechanism of heat transfer therethrough is radiation.

This invention accordingly provides an effective barrier or protective "wall" of inert gas intermediate the liquid sodium coolant any radioactive contaminates entrained therein and the circulating ambient cooling air carrying away heat for dissipation which is vented out into the atmosphere. Thus in the event of a breach of the double waled reactor vessel with leakage of the liquid sodium coolant therefrom, the intermediate inert gas barrier precludes a release of radioactive material out into the atmosphere through the circulating air and the potential for any high and distractive energy releases from a reaction of the highly reactive liquid sodium with air and water vapor.

What is claimed is:

1. A passive cooling system for liquid metal cooled nuclear reactors having a pool of liquid metal coolant with the heat generating fissionable fuel core substantially immersed in said pool of liquid metal coolant, the passive cooling system including a combination of spaced apart side-by-side partitions in generally concentric arrangement and providing for intermediate fluid circulation and heat transfer therebetween, comprising:

a reactor vessel for containing a pool of liquid metal coolant with a fuel core substantially immersed therein, a side wall of the reactor vessel forming an innermost first partition;

a guard vessel substantially surrounding the reactor vessel in spaced apart relation having a side wall forming a second partition;

a containment vessel substantially surrounding the guard vessel in spaced apart relation having a side wall forming an outer third partition;

a concrete silo substantially surrounding the containment vessel in spaced apart relation;

a first closed circulating fluid flow course for recirculation fluid coolant in a recycling path intermediate at least two of said partitions and extending therefrom upward above the reactor vessel; and a second circulating fluid flow course open to the ambient atmosphere adjoining at least a portion of the closed circulating system extending above the reactor vessel and consisting of at least one downcomer duct having an opening to the atmosphere in an upper area thereof and at least one adjacent riser duct having an opening to the atmosphere in a upper area thereof, said riser duct abutting at least a portion of the closed circulating flow course extending above the reactor vessel, the adjacent downcomer and riser ducts being joined together in fluid communication in their lower areas to provide an open circuit for the passage of ambient air from the atmosphere into and downward through a downcomer duct and around back up through a riser duct and out into the atmosphere.

2. The passive cooling system for liquid metal cooled nuclear reactors of claim 1, wherein the reactor vessel is located substantially buried below ground level.

3. The passive cooling system for liquid metal cooled nuclear reactors of claim 2, wherein the concrete silo substantially surrounding the buried reactor vessel, extends up beyond the ground level.

4. The passive cooling system for liquid metal cooled nuclear reactors of claim 3, wherein the containment vessel comprises a wall extending up beyond the ground level and includes a closing cover over the buried reactor vessel.

5. A passive cooling system for liquid metal cooled nuclear reactors having a pool of liquid metal coolant with the heat generating fissionable fuel core substantially immersed in said pool of liquid metal coolant, the passive cooling system including a combination of spaced apart side-by-side partitions in generally concentric arrangement and providing for intermediate fluid circulation and heat transfer therebetween, comprising:

a reactor vessel for containing a pool of liquid metal coolant with a fuel core substantially immersed therein, a side wall of the reactor vessel forming an innermost first partition;

a guard vessel substantially surrounding the reactor vessel in spaced apart relation having a side wall forming a second partition;

a collector cylinder substantially encircling the guard vessel in spaced apart relationship having an encircling wall forming a third partition;

a containment vessel substantially surrounding the guard vessel and collection cylinder in spaced apart relation having a side wall forming an outer fourth partition;

a closed circulating fluid flow course for recirculating fluid coolant in a recycling flow circuit including downward intermediate the fourth partition formed by the containment vessel side wall and the third partition formed by the collector cylinder encircling wall and back upward intermediate said third partition and the second partition formed by the guard vessel side wall; and a second circulating fluid flow course open to the ambient atmosphere adjoining at least a portion of the closed circulating system extending above the reactor vessel and consisting of a downcomer duct having an opening to the atmosphere in an upper area thereof and an adjacent riser duct having an opening to the atmosphere in an upper area thereof, said riser duct abutting at least a portion of the closed circulating flow course extending above the reactor vessel, the adjacent downcomer and rise ducts being joined together in fluid communication in their lower areas to provide an open circuit for the passage of ambient air from the atmosphere into and downward through the downcomer duct and around back up through a rise duct and out into the atmosphere whereby heat can be conveyed away from fluid circulating through the closed circulating system.

6. The passive cooling system for liquid metal cooled nuclear reactors of claim 5, wherein the reactor vessel is located substantially buried below ground level.

7. The passive cooling system for liquid metal cooled nuclear reactors of claim 6, wherein the concrete silo substantially surrounding the buried reactor vessel, extends up beyond the ground level.

8. The passive cooling system for liquid metal cooled nuclear reactors of claim 7, wherein the containment vessel comprises a wall extending up beyond the ground level and includes a closing cover over the buried reactor vessel.

9. The passive cooling system for liquid metal cooled nuclear reactors of claim 5, wherein the reactor vessel, guard vessel, collection cylinder and containment vessel are each circular in cross-section, of respectively increasing diameter and concentrically arranged with their side walls providing spaced apart partitions forming annular intermediate areas therebetween.

10. A passive cooling system for liquid metal cooled nuclear reactors having a pool of liquid metal coolant with the heat generating fissionable fuel core substantially immersed in said pool of liquid metal coolant, the passive cooling system including a combination of spaced apart side-by-side partitions in generally concentric arrangement and providing for intermediate fluid circulation and heat transfer therebetween, comprising:

a reactor vessel for continuing a pool of liquid metal coolant with a fuel core substantially immersed therein, a sidewall of the reactor vessel forming an innermost first partition;

a guard vessel substantially surrounding the reactor vessel in spaced apart relation having a side wall forming a second partition;

a containment vessel substantially surrounding the guard vessel in spaced apart relation having a side wall forming an outermost third partition;

a concrete silo substantially surrounding the containment vessel in spaced apart relation;

a multiplicity of baffles extending between the first and second partitions formed by the side walls of the spaced apart reactor and guard vessels dividing the space intermediate said partitions into several channels for fluid circulation and in open communication adjacent to the lowermost portion of said vessels whereby the fluid circulating channels are interconnected;

a closed circulating fluid flow course for recirculating fluid coolant in a recycling path comprising between the first and second partitions formed by the side walls of the spaced apart reactor and guard vessels; and a second circulating fluid flow course open to the ambient atmosphere adjoining at least a portion of the closed circulating flow course extending above the reactor vessel and consisting of at least one downcomer duct having an opening to the atmosphere in an upper area thereof and at least one adjacent riser duct having an opening to the atmosphere in an upper area thereof, said riser duct abutting at least a portion of the closed circulating flow course extending above the reactor vessel, the adjacent downcomer and rise ducts being joined together in fluid communication in their lower areas to provide an open circuit for the passage of ambient air from the atmosphere into and downward through a downcomer duct and around back up though a riser duct and out into the atmosphere.

11. The passive cooling system for liquid metal cooled nuclear reactor of claim 10, wherein the reactor vessel is located substantially buried below ground level.

12. The passive cooling system for liquid metal cooled nuclear reactors of claim 11, wherein the concrete silo substantially surrounding the buried reactor vessel extends up beyond the ground level.

13. The passive cooling system for liquid metal cooled nuclear reactor of claim 12, wherein the containment vessel comprises a wall extending up beyond the ground level and includes a closing cover over the buried reactor vessel.

14. The passive cooling system for liquid metal cooled nuclear reactors of claim 10, wherein the reactor vessel, guard vessel, and containment vessel are each circular in cross-section, of respectively increasing diameters and concentrically arranged with their side walls providing spaced apart partitions forming annular intermediate areas therebetween.

15. A passive cooling system for liquid metal cooled nuclear reactors having a pool of liquid metal coolant with the heat generating fissionable fuel core substantially immersed in said pool of liquid metal coolant, the passive cooling system including a combination of spaced apart side-by-side partitions in generally concentric arrangement and providing for intermediate fluid circulation and heat transfer therebetween, comprising:

a reactor vessel for containing a pool of liquid metal coolant with a fuel core substantially immersed therein, a side wall of the reactor vessel forming an innermost first partition and having a multiplicity of cavities in the outer side surface of the reactor vessel;

a guard vessel substantially surrounding the reactor vessel in spaced apart relation having a side wall forming a second partition;

a containment vessel substantially surrounding the guard vessel in spaced apart relation having a side wall forming an outer third partition;

a concrete silo substantially surrounding the containment vessel in spaced apart relation;

a closed circulating fluid flow course for recirculation fluid coolant in a recycling path intermediate at least two of said partitions and extending therefrom upward above the reactor vessel; and a second circulating fluid flow course open to the ambient atmosphere adjoining at least a portion of the closed circulating system extending above the reactor vessel and consisting of at least one downcomer duct having an opening to the atmosphere in an upper area thereof, said riser duct abutting at least a portion of the closed circulating flow course extending above the reactor vessel, the adjacent downcomer duct and riser ducts being joined together in fluid communication in their lower areas to provide an open circuit for the passage of ambient air from the atmosphere into and downward through a downcomer duct and around back up through a rise duct and into the atmosphere.

* * * * *